United States Patent [19]

Grubner et al.

[11] 4,081,690

[45] Mar. 28, 1978

[54] AUTOMATIC PHOTOGRAMMETRIC STEREO PLOTTER

[75] Inventors: Klaus Grübner, Jena, Gera; Werner Kunze, Jena-Winzerla, Gera; Werner Marckwardt, Jena-Lobeda, Gera, Germany

[73] Assignee: Jenoptik Jena G.m.b.H., Jena, Germany

[21] Appl. No.: 740,453

[22] Filed: Nov. 17, 1976

[51] Int. Cl.² .......................................... G01C 11/12
[52] U.S. Cl. ....................................... 250/558; 356/2
[58] Field of Search ................... 250/548, 557, 558; 356/2; 358/3

[56] References Cited
U.S. PATENT DOCUMENTS 3,145,303   8/1964   Hobrough ................... 250/558

Primary Examiner—James B. Mullins

[57] ABSTRACT

An automatic stereo plotter comprises a correlator and a follow-up unit, which is preferably employed to follow-up a measuring mark in z-direction relative to a stereo model to be evaluated. In order to improve the efficiency of the stereo plotter additional means are provided which increase the amplification factor between the parallax error signals at the output of the image correlator and the follow-up signals. Thus variations in the video signals derived from the measuring photographs are compensated for. Such means are, for example, an adjustable amplifier, which can be set to a plurality of stable amplification factors, and an analog multiplier which, due to a corresponding control voltage, permits a continuous variation of the amplification.

1 Claim, 1 Drawing Figure

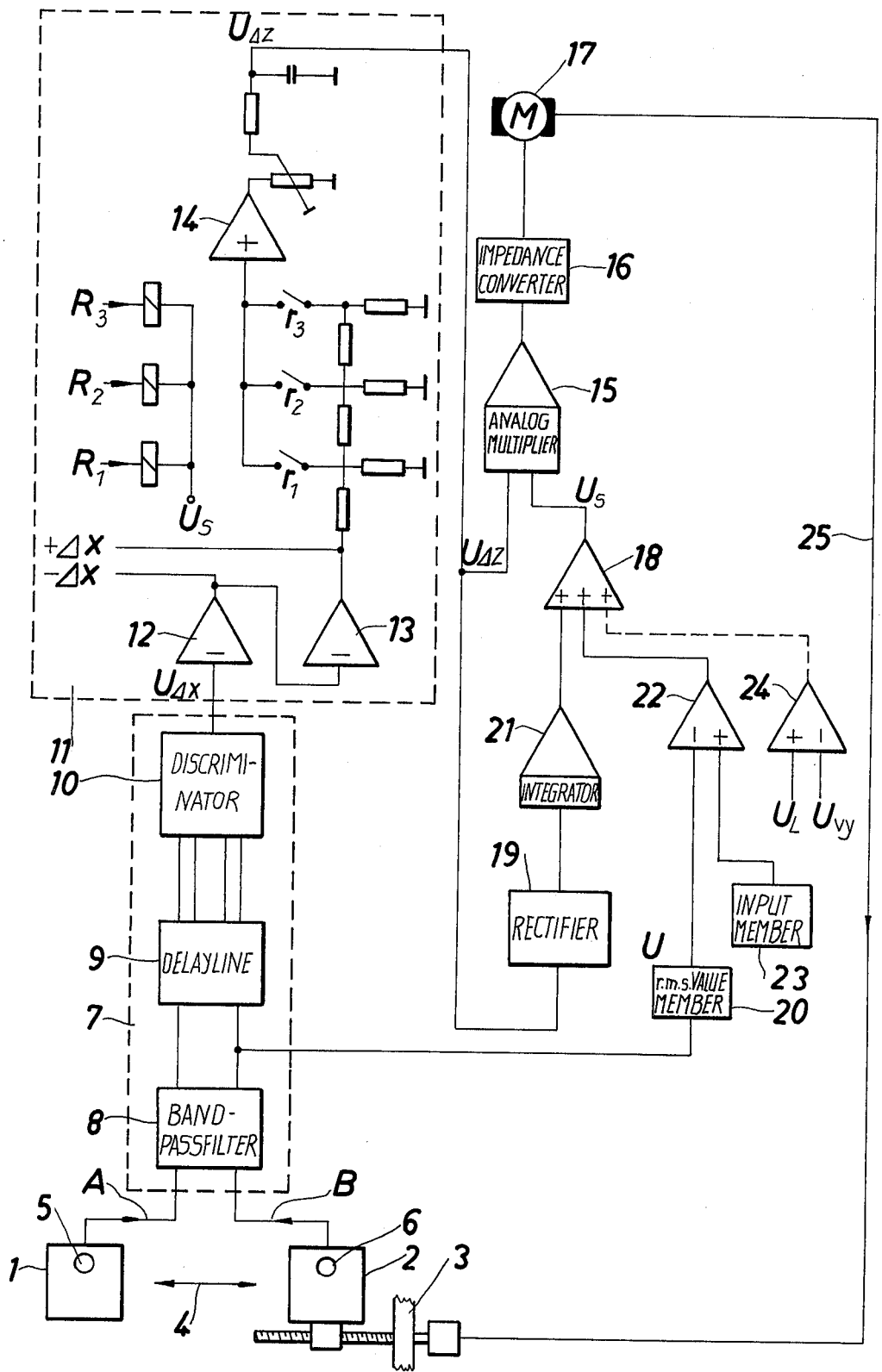

AUTOMATIC PHOTOGRAMMETRIC STEREO PLOTTER

This invention relates to an automatic stereo plotter for evaluating terrain photographs.

Previous apparatus of the kind feed the video signals derived from terrain photographs into an image correlator which, as a rule, is constituted of band-pass filters, delay lines and one discriminator which is capable to decide whether or not phase displacements are inherent in the video signals derived from a scanning device. The resulting correlator output error signals, if any, are fed into a follow-up member which automatically provides the terrain profile $z = f(y)$.

Alternative to movements parallel to the z-coordinate in dependence on the y-coordinate, the follow-up movement can be preformed parallel to the x-or y-coordinate in dependence on the z-or x-coordinate.

In order to match the image correlator to the numerous varying conditions inherent in a terrain photograph, such as variations of the information density, the image details to be correlated, or the terrain profile, previous stereo plotters including video correlators only provide means for varying the raster size, for exploiting a suitable video signal frequency range, and means for a raster deformation or a variation of the advance speed of the measuring mark relative to the photographs.

The aforementioned means do not sufficiently improve an image evaluation, since the amplification in the z-follow-up circuit does not remain optimal and the criteria for using one or the other of the means are not always unique.

When the amplification is not optimal, the operation speed and the precision of the device decreases, the latter when a measuring mark is automaticaly displaced on a stereo model.

A main disadvantage of the known devices is the unsteadiness of the slope of the correlator discriminator curve in dependence on the raster size from whence a departure from an effective amplification results.

Due to the properties inherent in a circuit the amplification, however, may not exceed a certain maximum value, dependent on an adjusted state, since the follow-up system will else become resonant.

This means that the amplification is adjusted for an optimum of image positions and, when the slope is flattened, the amplification decreases which involves the aforementioned disadvantages.

It is an object of the present invention to provide criteria described hereinbelow in more detail for evaluating the state of and means for correcting the amplification factor in an automatic stereo plotter. It is a further object of the present invention to continuously adjust the amplification in a stereo plotter to optimal characteristics by said means and hence to increase the effectivity of said stereo plotter concerning advance speed and precision.

These objects are realised by an automatic photogrammetric stereo plotter with an image correlator which includes additional circuit means for varying the amplification factor, arranged between the image correlator output and the z-follow-up member. Said means compensates for variations of the video signals derived from aerial photographs by a corresponding variation of the amplification factor.

Advantageously, an operational amplifier adjustable to a plurality of stable settings, and an analog multiplier which permits a continuous variation of the amplification by means of a corresponding control voltage are provided to effect the amplification variations.

By virtue of the inventional solution the aforementioned disadvantages of the known stereo plotters are obviated in that a stable correction of the amplification is provided in dependence on the raster size, and a correction of the amplification is automatically effected in dependence on the respective parameters such as information density, advance speed, and lateral tilt.

The circuit arrangement aims at attaining a maximal amplification in each evaluation condition possible. The amplification is variable according to the following criteria, or combinations thereof:

the raster displacement voltage is a measure with respect to the lagging error, the difference between a given maximum value and the root mean square value of the video signal, the difference between the given maximum value and the respective voltage of the correlator, the voltage which is proportional to a lateral tilt of terrain, the voltage which is proportional to the advance speed.

In order that the invention may be more readily understood, reference is made to the accompanying drawings which illustrate diagrammatically and by way of example one embodiment thereof and in which The FIGURE is a block scheme of the inventional automatic stereo plotter arrangement.

In the FIGURE only those components are shown which are relevant to understand the inventional automatical stereo plotter.

Video signals A and B are derived by means of two light electric scanners 5, 6 from homologous points of a stereo pair of terrain photographs 1, 2, in which the photograph 2 is displaced relative to the photograph 1 by means of a spindle drive 3 in a direction indicated by a double arrow 4. The video signals A, B are fed into an image correlator 7 constituted of band-pass filters 8 for limiting the frequency band, delay lines 9 for displacing the video signals relative to each other in time, and a discriminator 10. The characteristic of the discriminator 10 is such that the provided displacement pulses correspond to the size and direction of the displacements.

An x-parallax error signal $U_{\Delta x}$ at the output of the discriminator 10 is fed into an amplifier unit 11, comprising two operational amplifiers 12 and 13 where the error signal is split into a voltage of considerably high frequency for displacing the scanning raster of a not shown vidicon and into a z-signal for controlling a servo-motor 17.

The z-signal is, in accordance with the raster size, differently amplifed in a further operational amplifier 14. The amplifier unit 11 varies the amplification of a parallax error signal in order to eliminate parallax errors in dependence on the raster size. The signals which effect a counter movement of the rasters coordinated to the stereo photographs are amplified by operational amplifiers 12, 13.

Relays $R_1$; $R_2$; $R_3$ connected via respective contacts $r_1$; $r_2$; $r_3$ to an operational voltage $U_B$ permit three stable settings of the amplification which correspond to the respective raster sizes. A motor control signal $U_{\Delta z}$ derived from the output of an operational amplifier 14 is multiplied with a variable control voltage $U_s$ in an analog multiplier 15 to enable a continuous control of a motor 17 by means of a motor control signal z of variable amplification.

The motor control is effected via an impedance converter 16. The servo-motor 17 operates a drive spindle 3 via a connection 25.

The control voltage $U_s$ for the analog multiplier 15 is produced in a summation amplifier 18 from the z-motor control signal, which corresponds to the raster displacement voltage and which was before rectified in a full-wave rectifier 19 and smoothed out in an integrator 21, and from a difference signal formed in a differential amplifier 22 between a stable value and the root mean square (r.m.s.) value of the video signals formed in an r.m.s. member 20.

The stable value is fed in by an input member 23, which can be, for example, a potentiometer.

The r.m.s. value member 20 derives the information from out of the number of useful video signals.

Alternatively, a voltage $U_L$ proportional to the terrain tilt and a voltage $U_{vy}$ proportional to the scanning speed are fed into a summation amplifier 24 via an additional summation amplifier 21.

The operation of the aforedescribed circuit arrangement will be explained hereinafter:

The discriminator voltage derived from the correlator 7 is fed via circuits for varying the amplification into the motor control after being split into a fast responsive raster displacement signal in x-direction ($-\Delta x$ and $+\Delta x$, respectively) and into a z-control signal $U_{\Delta z}$ for the motor control. The circuits responsive for variating the amplification include the operational amplifier 14, which realises three stable amplification factors, and the analog multiplier 15 which, by a respective control voltage $U_{\Delta z}$, continuously varies the amplification of the z-signal of the motor control.

The three stable amplification factors are determined by the raster size selected, that is, the smaller the raster size and hence the number of image details to be correlated, the greater is the amplification factor. The control voltage for the analog mulitplier 15 is substantially produced by the amount of the raster displacement and by the z-motor control signal resulting therefrom, respectively.

In this manner the state of lagging (for example, lagging error) can be detected and compensated for by a respective variation of the amplification.

Additionally, other criteria can influence the control voltage via the summation amplifier 24. So, for example, is the difference between a possible maximum value of the r.m.s. value of the video signal and the real value of a definite image point at measure of how much the slope of the discriminator curve is reduced at said image point.

The control voltage for the analog multiplier 15 can also be obtained from out of the difference between a given maximum value and the respective voltage of the correlator 7, without delay lines 9.

The control voltage affects the multiplier 15 as a variable factor which, reasonably at $U_s = 1$, is the basis of the amplification factor.

With a reduced steepness of the slope of the discriminator curve, in other words, with a growing discrepancy between the advance speed in y-direction and the follow-up speed, which results in the lagging error, the amplification is raised by an automatic increase of $U_s$, in order to re-establish optimal conditions.

The invention is not restricted to the above embodiments, particularly to the three amplification settings.

The control voltage for the analog multiplier can, just as well, be composed of a plurality of the aforementioned components.

We claim:

1. An automatic photogrammetric stereo plotter comprising
    two photographs,
    drive means for displacing at least one of said photographs,
    two scanning means for scanning said photographs to detect homolog points in said photographs and for converting optical signals into electric signals,
    a correlator for comparing said electric signals obtained from the one of said photographs to the electric signals obtained from the other of said photographs, and to form a parallax error signal,
    an amplifier unit comprising
        at least one operational amplifier of stepwise controllable amplification in dependence on the size of a scanned image area,
        said amplifier unit amplifying said parallax error signal,
    an analog multiplier for continuously varying the amplification in dependence on a control voltage and for multiplying said control voltage by the amplified parallax error signal, a servo-motor for operating said drive means,
    and a power stage for driving said motor by the product obtained from out of the control signal and said amplified parallax error signal.

* * * * *